(12) United States Patent
Heinrich et al.

(10) Patent No.: US 8,120,326 B2
(45) Date of Patent: Feb. 21, 2012

(54) RECHARGEABLE BATTERY WITH AN INTERNAL DISCHARGER FOR SHIFTING THE LOAD STATE OF THE BATTERY TO A LOWER LOAD STATE

(75) Inventors: Thomas Heinrich, Leinfelden (DE); Cornelius Liebenow, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 888 days.

(21) Appl. No.: 12/166,376

(22) Filed: Jul. 2, 2008

(65) Prior Publication Data
US 2009/0009136 A1    Jan. 8, 2009

(30) Foreign Application Priority Data
Jul. 6, 2007  (DE) .......................... 10 2007 031 557

(51) Int. Cl.
*H01M 10/46*    (2006.01)
(52) U.S. Cl. ....................................... 320/136
(58) Field of Classification Search ................. 320/127, 320/128, 134, 136, 162
See application file for complete search history.

(56) References Cited

U.S. PATENT DOCUMENTS
6,054,659 A * 4/2000 Lee et al. ...................... 200/181
2006/0255768 A1* 11/2006 Yoshio ........................... 320/134

FOREIGN PATENT DOCUMENTS
EP            0 298 556 A1    1/1989

* cited by examiner

*Primary Examiner* — Edward Tso
(74) *Attorney, Agent, or Firm* — Ronald E. Greigg

(57) ABSTRACT

A rechargeable battery having a switch connects an internal load to the battery so that the battery can be shifted to a predetermined, lower load state. To shift the rechargeable battery into a lower load state for long-term storage, a Zener diode is connected in series with a resistor and the switch. The rechargeable battery voltage, which corresponds to the predetermined, lower load state, is selected as the breakdown voltage of the Zener diode. Manual actuation of the switch shifts the rechargeable battery to a lower load state, if the current load state is higher than the predetermined, lower load state. A digital version has a digital circuit connected electrically to the switch which is arranged for measuring the rechargeable battery voltage and which in the ON state triggers the switch if the measured rechargeable voltage exceeds a value that corresponds to the predetermined, lower load state.

20 Claims, 1 Drawing Sheet

# RECHARGEABLE BATTERY WITH AN INTERNAL DISCHARGER FOR SHIFTING THE LOAD STATE OF THE BATTERY TO A LOWER LOAD STATE

CROSS-REFERENCE TO RELATED APPLICATIONS

This application is based on German Patent Application No. 10 2007 031 557.2 filed on Jul. 6, 2007, upon which priority is claimed.

BACKGROUND OF THE INVENTION

1. Field of the Invention

The invention relates to a rechargeable battery, including a switch, by means of which switch an internal load is connectable to the rechargeable battery, so that the rechargeable battery can be shifted to a predetermined, lower load state.

2. Description of the Prior Art

A rechargeable battery of this kind is already known from German Patent Disclosure DE 10 04 981 A1. Rechargeable lithium-ion cells require a suppressor circuit, which monitors the charging operation and prevents an overly high load state and possible resultant cell damage by blocking further charging. In the rechargeable battery known from DE 101 04 981, ongoing operation should also be monitored, since a load state that is assessed as not yet critical at a low ambient temperature can lead to cell damage at a high temperature. The known rechargeable battery therefore has a relatively complex circuit arrangement, which measures and monitors the load state and the ambient temperature continuously. If the two threshold switches provided for these two parameters respond simultaneously (on reaching a predetermined upper limit value for the temperature on the one hand and for the rechargeable battery voltage—corresponding to a load state—on the other), then the circuit by means of a switch connects a load to the rechargeable battery and discharges the rechargeable battery to such an extent that it is no longer in a critical load state or at a critical temperature.

Lithium rechargeable batteries, however, are problematic, not only in terms of their operation and charging but also in terms of storage of the rechargeable batteries. In general, it must be assumed that accumulators (rechargeable batteries) can be stored equally well not only in the fully or partly charged state but even after all the energy stored in the cells has been completely exhausted. Experience shows, however, that lithium-ion cells especially, and rechargeable batteries constructed of them, on being stored in the (virtually closed) fully charged state are subject to more pronounced aging than is the case for storage in the partially charged or completely discharged state. This aging is expressed in an increase in the internal resistance of the battery and in a irreversible loss of the energy-storing capacity of the lithium-ion batteries.

Storage in the fully charged state, above all, accelerates the aging of the lithium-ion cells, so that even after being stored for a month, a pronounced decrease in the capacity of the rechargeable battery can occur. To avoid this effect, newly manufactured cells are stored and shipped in a partly charged state. If battery packs in use are expected to be stored for a relatively long time, it has been expedient so far not to charge these rechargeable batteries again (fully) after their last use, or by connecting a consumer (a device or an external electrical load) to the lithium-ion rechargeable battery, to shift the rechargeable battery to a partly charged state.

OBJECT AND SUMMARY OF THE INVENTION

For an analog version of the invention, a Zener diode is provided, which is connected in series with a resistor and a switch, and the rechargeable battery voltage which corresponds to the predetermined, lower load state is selected as the Zener diode breakdown voltage. By manual actuation of the switch, or a discharge switch to whose actuation the switch responds, the rechargeable battery is shifted according to the invention to a lower load state, if the current load state is higher than the predetermined, lower load state.

For a digital version of the invention, a digital circuit electrically connected to the switch is provided, which is arranged for measuring the rechargeable battery voltage and which in the ON state triggers the switch if the measured rechargeable battery voltage exceeds a value that corresponds to the predetermined, lower load state. Furthermore, a discharge switch is provided which, upon manual actuation, switches the circuit on, and thus sets into motion the shift into the optimal load state for storage.

The basis of the invention is the integration of a device with the rechargeable battery, by which device the load state of the fully or partly charged rechargeable battery (cell) can be shifted quickly and simply to a lower load state, specifically whenever the user expects not to use the rechargeable battery for a relatively long time. The lower load state sought is more favorable for long-term storage of the rechargeable battery than the fully charged state, since it is associated with reduced aging even during relatively long-term storage. Accordingly, the invention leads to a prolongation of the service life of the rechargeable battery. It is attained that rechargeable batteries that are used only occasionally can reversibly pick up a greater amount of energy on being charged than would be the case after repeated storage in the fully charged state. In this way, the otherwise irreversible loss of capacity from storage of the battery in the fully charged state is prevented. For attaining discharging for the sake of an optimal storage state, no additional device is necessary in the invention. Nor is it necessary for the device, which is normally supplied with power by this rechargeable battery, to be switched on solely for the purpose of discharging the rechargeable battery. It is especially advantageous that for a particular rechargeable battery cell chemistry, an optimal load state in terms of storage can be established individually, either—in analog fashion—by the choice of the breakdown voltage of the Zener diode, or—digitally—as a directly predeterminable lower value for the rechargeable battery voltage.

Accordingly, the invention is especially advantageously applicable to battery packs that are not permanently connected to the device that is to be supplied with power, and to rechargeable batteries that are not in constant use or that are stored for relatively long times after an occasional use. Such conditions of applicability are typically found in tool rentals, in medical technology, or in the military field.

In an especially preferred embodiment of the analog version of the invention, the current flowing during the shift to the predetermined, lower load state effects the locking of the switch, and the locking of the switch is canceled when the breakdown voltage is reached. In this way, the discharge needs merely to be initiated by actuating a key switch a single time, for example. On the other hand, even the slight flow of current that may still exist below the breakdown voltage is disrupted entirely by opening the switch, so that an unwanted greater discharge, beyond the predetermined, lower load state, is avoided.

Especially advantageously, this embodiment can be refined by embodying the switch as a relay and providing a discharge switch whose actuation actuates the relay which, in cooperation with a circuit arrangement, switches to locking as long as the Zener current is flowing.

In all the analog versions of the invention, it is advantageous to provide a display device, which is supplied by the current flowing during the shift to the predetermined, lower load state, and which displays the shift of the rechargeable battery to the predetermined, lower load state. This can be attained quite simply, in a refinement of the aforementioned embodiment, in that the display device displays the shift to the predetermined, lower load state by means of optical or acoustical signals.

In the digital version of the invention, an embodiment is preferred in which the circuit switches itself off after the shift of the rechargeable battery to the predetermined, lower load state.

In a further digital embodiment, it is advantageous to provide an optical display device triggered by the digital circuit, which device displays a request for charging the rechargeable battery when the rechargeable battery voltage measured upon switching on of the circuit exceeds the aforementioned predetermined value by a predetermined extent, and which displays a progressive shift of the rechargeable battery into the predetermined, lower load state. Hence the user is informed whether the discharge has been set in motion, or the battery still has to be charged in order to be put into the optimal storage load state.

In all the digital embodiments of the invention, it is advantageous to embody the discharge switch as an ON switch of a user-actuated unit, in particular a load state display, of the rechargeable battery, and to configure the ON switch such that when actuated briefly, it switches on the unit, and when actuated for a longer time, it switches on the digital circuit.

All the embodiments of the invention can be used especially advantageously in rechargeable batteries that are made using a technology—in particular lithium-ion- or lithium-polymer-based—in which the storing the rechargeable battery in a non-optimal load state leads to increased aging of the rechargeable batter.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

The term battery or rechargeable battery is understood hereinafter to mean the electrical interconnection of one or more rechargeable cells inside a battery housing. The described rechargeable battery of the invention can be used, for instance, for supplying power to electric power tools.

Figure 1:
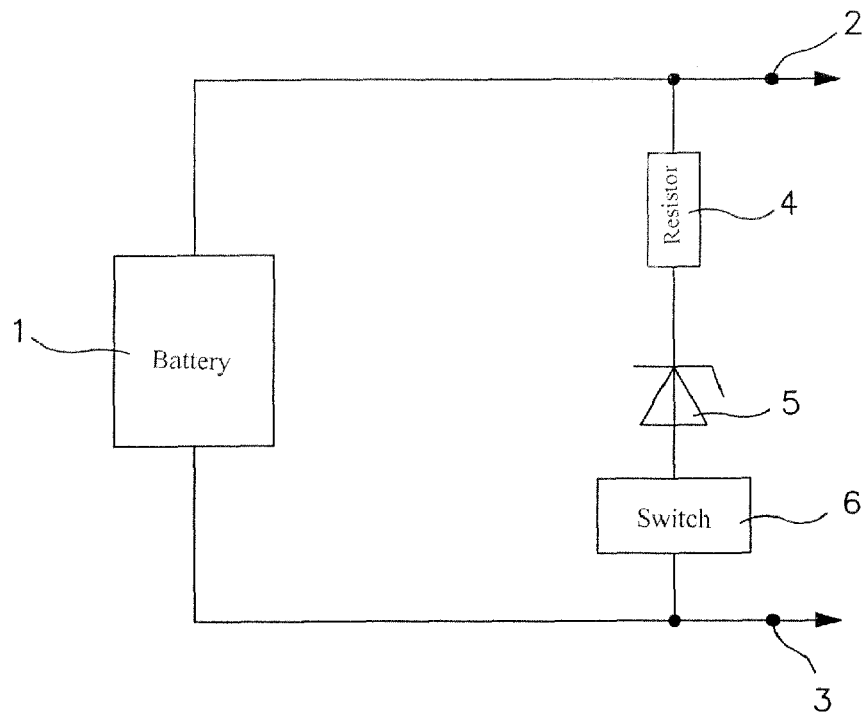
FIG. 1, is a schematic illustration in terms of a circuit diagram that shows an exemplary embodiment for the analog version of the invention.

FIG. 1 shows a first exemplary embodiment of the invention. The two poles of a rechargeable lithium-ion battery 1 with one or more electrochemical cells are connected by terminals (contacts) 2 and 3 that are disposed on the periphery of a battery pack. The terminals 2 and 3 serve to connect a current-drawing device (not shown) or for charging the rechargeable battery 1.

In the analog version of the invention shown in FIG. 1, a series circuit comprising a Zener diode 5, a resistor 4, and a switch 6, is connected in parallel to the rechargeable battery 1. By actuation of the switch 6, which in the exemplary embodiment is assumed to be manually actuatable on the battery pack, the rechargeable battery 1 is short-circuited internally via the Zener diode 5. To prevent the flow of excessively high currents, the resistor 4 is connected in series with the Zener diode 5. By the selection of the suitable breakdown voltage of the Zener diode 5, the rechargeable battery 1 is discharged to a defined load state.

The mode of operation of this exemplary embodiment will now be described. An empirically ascertained ideal storage load state, such as 70%, corresponds to a specific associated rechargeable battery voltage of the respective rechargeable battery, which is selected as the breakdown voltage of the Zener diode 5. If the present rechargeable battery voltage of the rechargeable battery 1 to be shifted to the optimal load state exceeds the rechargeable battery voltage corresponding to the predetermined, lower load state, then the discharge is set into motion directly by manual actuation of the switch 6 or indirectly by means of a relay that actuates the switch 6 (that is, in any case, not until an upper limit voltage is exceeded), since the Zener diode 5 is conductive above its breakdown voltage. The switch 6 may also be embodied by an electronic switch, such as an operational amplifier, which is switched by actuating a key switch.

Once the rechargeable battery voltage, as a result of the discharge, has relatively quickly reached the breakdown voltage, the flow of current should be disrupted entirely by opening of the switch 6, in order to prevent a gradual, complete discharge of the rechargeable battery 1 via the Zener diode 5 (residual current).

The current flowing during the compensation operation can be utilized for locking the switch 6. When the breakdown voltage (Zener voltage) is reached, the locking of the switch is discontinued, for instance, by triggering the base of a transistor of a circuit arrangement (not shown) in a known manner via the Zener diode 5, whereupon, via the collector-to-emitter path of the transistor, the excitation current circuit of a relay is switched to locking precisely as long as the Zener current is flowing.

The current flowing during the discharging can be converted by means of an incandescent bulb or LEDs into an optical signal as well, which shows the user that the partially loaded state sought has not yet been reached. The conversion of the energy to be converted in the discharging into other, readily perceptible signals (such as acoustical signals) is also a possibility for making the progress of the discharging clear to the user.

Figure 2:
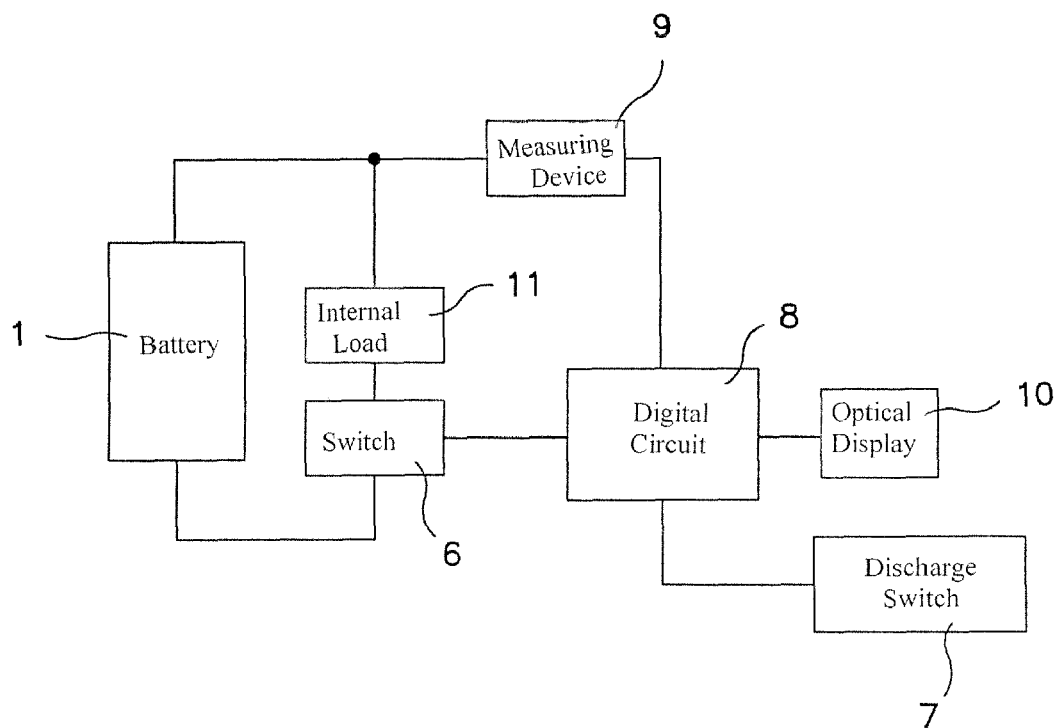
FIG. 2 is a similar illustration that shows an exemplary embodiment for the digital version of the invention by means of a digital circuit integrated with the rechargeable battery.

In FIG. 2, an embodiment of a rechargeable battery 1 of the invention is shown with a digital embodiment of the autonomic discharger.

After manual actuation of a discharge switch 7 for a relatively long time (for about 5 seconds) by a load state display switch that is provided on a standard basis on the rechargeable battery, the digital circuit 8 is switched on, and the rechargeable battery voltage is measured, for instance, by means of the measuring device 9. From the battery voltage measurement, the rechargeable battery 1 can tell the user, for instance, by means of the optical display 10, whether the compensation has been set in motion, or whether the rechargeable battery 1 must first be charged still higher in order to reach the optimal storage load state.

If discharging of the rechargeable battery 1 is necessary, then an internal load 11 (such as a resistor) is connected to the rechargeable battery 1 via a switch 6, embodied in particular electronically or electromechanically, that is triggered by the circuit 8. On the basis of a suitable algorithm, the rechargeable battery voltage is measured constantly and compared with the preset value. The preset rechargeable battery voltage corresponds to the lower load state sought. Once this value is reached first the load 11 is switched off, and after that the digital circuit 8 is switched off, in order to prevent the rechargeable battery 1 from being deeply discharged.

The functions of the basic circuit described can be incorporated into the know IC circuits that are used to monitor the operation of rechargeable lithium cells.

The foregoing relates to preferred exemplary embodiments of the invention, it being understood that other variants and embodiments thereof are possible within the spirit and scope of the invention, the latter being defined by the appended claims.

We claim:

1. A rechargeable battery having a voltage, comprising: a switch connecting an internal load to the rechargeable battery so that the rechargeable battery voltage can be shifted to a predetermined, lower load state, and a Zener diode connected in series with a resistor and the switch,
   wherein the Zener diode has a breakdown voltage selected to correspond to the predetermined, lower load state of the rechargeable battery voltage, and
   wherein the rechargeable battery, upon manual actuation of the switch or a discharge switch to whose actuation the switch responds, is shifted to a lower load state if a current load state is higher than the predetermined, lower load state.

2. The rechargeable battery as defined by claim 1, wherein current flowing during a shift to the predetermined, lower load state effects the locking of the switch, and the locking of the switch is canceled when the breakdown voltage is reached.

3. The rechargeable battery as defined by claim 2, wherein the rechargeable battery is a lithium-ion or a lithium-polymer-based battery and storing the rechargeable battery in a non-optimal load state leads to increased aging of the rechargeable battery.

4. The rechargeable battery as defined by claim 2, wherein the switch is embodied as a relay and the discharge switch is provided, whose actuation actuates the relay, and wherein the relay, in cooperation with a circuit arrangement, switches to locking as long as the Zener current is flowing.

5. The rechargeable battery as defined by claim 3, further comprising a display device that is supplied by the current flowing during the shift to the predetermined, lower load state and which displays the shift of the rechargeable battery to the predetermined, lower load state.

6. The rechargeable battery as defined by claim 5, wherein the display device displays the shift to the predetermined, lower load state by optical or acoustical signals.

7. The rechargeable battery as defined by claim 2, further comprising a display device, that is supplied by the current flowing during the shift to the predetermined, lower load state and which displays the shift of the rechargeable battery to the predetermined, lower load state.

8. The rechargeable battery as defined by claim 7, wherein the display device displays the shift to the predetermined, lower load state by optical or acoustical signals.

9. The rechargeable battery as defined by claim 1, wherein the rechargeable battery is a lithium-ion or a lithium-polymer-based battery and storing the rechargeable battery in a non-optimal load state leads to increased aging of the rechargeable battery.

10. A rechargeable battery having a voltage, comprising: a switch connecting an internal load to the rechargeable battery so that the rechargeable battery can be shifted to a predetermined, lower load state, and a digital circuit connected electrically to the switch,
    wherein the digital circuit is arranged for measuring the rechargeable battery voltage and which in an ON state triggers the switch if the measured rechargeable battery voltage exceeds a value that corresponds to the predetermined, lower load state, and
    wherein a discharge switch is connected electrically to the digital circuit and upon manual actuation switches the digital circuit on.

11. The rechargeable battery as defined by claim 10, wherein the digital circuit switches itself off after a shift of the rechargeable battery to the predetermined, lower load state.

12. The rechargeable battery as defined by claim 11, wherein the discharge switch is embodied as an ON switch of a load state display of the rechargeable battery; and wherein the ON switch is configured such that upon brief actuation it switches the display on and upon longer actuation it switches the digital circuit on.

13. The rechargeable battery as defined by claim 11, further comprising an optical display device triggered by the digital circuit, wherein the display device displays a request for charging the rechargeable battery when the rechargeable battery voltage measured upon switching on of the circuit exceeds the predetermined value by a predetermined extent, and displays a progressive shift of the rechargeable battery into the predetermined, lower load state.

14. The rechargeable battery as defined by claim 13, wherein the discharge switch is embodied as an ON switch of a user-actuated unit of the rechargeable battery; and wherein the ON switch is configured such that upon brief actuation it switches the unit on and upon longer actuation it switches the digital circuit on.

15. The rechargeable battery as defined by claim 11, wherein the discharge switch is embodied as an ON switch of a user-actuated unit of the rechargeable battery; and wherein the ON switch is configured such that upon brief actuation it switches the unit on and upon longer actuation it switches the digital circuit on.

16. The rechargeable battery as defined by claim 10, further comprising an optical display device triggered by the digital circuit, wherein the display device displays a request for charging the rechargeable battery when the rechargeable battery voltage measured upon switching on of the digital circuit exceeds the predetermined value by a predetermined extent, and displays a progressive shift of the rechargeable battery into the predetermined, lower load state.

17. The rechargeable battery as defined by claim 16, wherein the discharge switch is embodied as an ON switch of a user-actuated unit of the rechargeable battery; and wherein the ON switch is configured such that upon brief actuation it switches the unit on and upon longer actuation it switches the digital circuit on.

18. The rechargeable battery as defined by claim 10, wherein the discharge switch is embodied as an ON switch of a user-actuated unit of the rechargeable battery, and that wherein the ON switch is configured such that upon brief actuation it switches the unit on and upon longer actuation it switches the digital circuit on.

19. The rechargeable battery as defined by claim 10, wherein the rechargeable battery is a lithium-ion or a lithium-polymer-based battery and storing the rechargeable battery in a non-optimal load state leads to increased aging of the rechargeable battery.

20. The rechargeable battery as defined by claim 10, wherein the discharge switch is embodied as an ON switch of a load state display of the rechargeable battery; and wherein the ON switch is configured such that upon brief actuation it switches the display on and upon longer actuation it switches the digital circuit on.

* * * * *